United States Patent
Okuda et al.

(10) Patent No.: US 12,405,414 B2
(45) Date of Patent: Sep. 2, 2025

(54) DISPLAY DEVICE AND GAME MACHINE

(71) Applicant: OMRON Corporation, Kyoto (JP)

(72) Inventors: Mitsuru Okuda, Kyoto (JP); Yasuhiro Tanoue, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 18/481,217

(22) Filed: Oct. 4, 2023

(65) Prior Publication Data

US 2024/0151891 A1    May 9, 2024

(30) Foreign Application Priority Data

Nov. 9, 2022    (JP) .................................. 2022-179780

(51) Int. Cl.
    *F21V 8/00*        (2006.01)
    *A63F 7/02*        (2006.01)

(52) U.S. Cl.
    CPC ............ *G02B 6/0036* (2013.01); *A63F 7/022* (2013.01); *G02B 6/0068* (2013.01); *G02B 6/0038* (2013.01); *G02B 6/006* (2013.01)

(58) Field of Classification Search
    CPC .. G02B 6/0036; G02B 6/0068; G02B 6/0038; G02B 6/006; A63F 7/022
    See application file for complete search history.

(56) References Cited

U.S. PATENT DOCUMENTS

| | | | | |
|---|---|---|---|---|
| 5,575,549 | A | * 11/1996 | Ishikawa | G02B 6/0061 362/330 |
| 2015/0185396 | A1 | * 7/2015 | Takagi | G02B 6/0061 362/613 |
| 2018/0164492 | A1 | * 6/2018 | Takagi | H04N 13/32 |
| 2019/0146273 | A1 | * 5/2019 | Ni | G02F 1/133602 349/62 |
| 2020/0025993 | A1 | * 1/2020 | Fattal | G02B 30/33 |

FOREIGN PATENT DOCUMENTS

| | | | | |
|---|---|---|---|---|
| JP | | 6394765 | B1 * 9/2018 | |
| JP | | 6402812 | B1 * 10/2018 | ............... F21S 2/00 |
| JP | | 2021144129 | 9/2021 | |
| WO | WO-2019030978 | A1 * | 2/2019 | ............... F21S 2/00 |

* cited by examiner

*Primary Examiner* — Fatima N Farokhrooz
(74) *Attorney, Agent, or Firm* — JCIPRNET

(57) ABSTRACT

A minimum display unit forming a pattern, displayable by a light guide plate of a display device, has first and second prisms with reflective surfaces in a curved surface shape that is convex relative to an incident surface of the light guide plate. The first and second prisms are configured such that a ratio of light quantities from first and second light sources having different emission colors into the light guide plate, reflected by the reflective surface of the first prism, and directed to a predetermined direction is a first ratio; a ratio of light quantities from second and third light sources having different emission colors into the light guide plate, reflected by the reflective surface of the second prism, and directed to the predetermined direction is a second ratio. The first and second ratios are set such that the minimum display unit is displayed in a predetermined display color.

6 Claims, 6 Drawing Sheets

(a)

(b)

Incident surface 2a

DISPLAY DEVICE AND GAME MACHINE

CROSS-REFERENCE TO RELATED APPLICATION

This application claims the priority benefits of Japanese application no. 2022-179780, filed on Nov. 9, 2022. The entirety of the above-mentioned patent application is hereby incorporated by reference herein and made a part of this specification.

TECHNICAL FIELD

The disclosure relates to a display device capable of displaying a pattern using a light guide plate and a game machine having such a display device.

BACKGROUND

In the display device that displays a pattern using a light guide plate, techniques have been proposed to make the color of the displayed pattern a mixture of light emission colors from multiple light sources (see, e.g., Patent Document 1 (Japanese Patent Application Laid-Open (JP-A) No. 2021-144129)).

For example, the display device disclosed in Patent Document 1 includes a light guide plate capable of displaying at least one pattern and multiple light sources configured side-by-side along the incident surface of the light guide plate. One surface of the light guide plate is provided with multiple prisms arranged along the pattern and having reflective surfaces that reflect light emitted from any of the light sources and incident into the light guide plate from the incident surface to emit from the emission surface of other surface of the light guide plate. The first light source and the second light source among the light sources emit light having colors different from each other. Moreover, the reflective surface of the individual prism configured along a particular sub-pattern of the pattern are defined as a curved surface shape that is convex with respect to the incident surface of the light guide plate, and are configured to reflect light from each of the first light source and the second light source toward the same direction on the other side of the light guide plate.

In the above techniques, the display device is capable of making the sub-pattern appear to glow with additive color mixing of the light from the first light source and the light from the second light source. However, in order to enhance the interest of the observer, it is desirable to be able to express the pattern with a wider variety of color combinations.

The disclosure provides a display device that is capable of expressing a displayed pattern with a wider variety of color combinations.

SUMMARY

In one embodiment of the disclosure, a display device is provided. The display device includes a light guide plate defined in a sheet shape with a transparent member, capable of displaying at least one pattern, and having an incident surface defined on one lateral surface, and multiple light sources facing the incident surface of the light guide plate and provided along a longitudinal direction of the incident surface. The light sources include at least a first light source, a second light source, and a third light source having light emission colors different from each other. The light guide plate includes multiple prisms defined on one surface of the same and arranged along the pattern for emitting light from any of the light sources entering the light guide plate from the incident surface at other surface of the light guide plate. The pattern is configured by a combination of multiple minimum display units, and at least one of the minimum display units has a first prism and a second prism among the prisms. Each of the first prism and the second prism has a reflective surface defined as a curved surface shape that is convex with respect to the incident surface along the one surface of the light guide plate. The first prism is configured such that a ratio of a first light quantity of a first light emitted from the first light source, reflected by the reflective surface of the first prism, emitted at the other surface of the light guide plate, and directed to the predetermined direction to a second light quantity of a second light, emitted from the second light source, reflected by the reflective surface of the first prism, emitted at the other surface of the light guide plate, and directed to the predetermined direction is a first ratio. The second prism is configured such that a ratio of a third light quantity of a third light emitted from the second light source, reflected by the reflective surface of the second prism, emitted at the other surface of the light guide plate, and directed to the predetermined direction to a fourth light quantity of a fourth light emitted from the third light source, reflected by the reflective surface of the second prism, emitted at the other surface of the light guide plate, and directed to the predetermined direction is a second ratio. The first ratio and the second ratio are set such that the minimum display unit is displayed in a predetermined display color. By having such a configuration, this display device is capable of expressing the displayed pattern in a wider variety of color combinations.

In this display device, the first prism is configured such that as the first ratio of the first light quantity to the second light quantity increases, a normal direction of a center of the reflective surface of the first prism faces a direction closer to the first light source than the second light source on the one surface of the light guide plate. The second prism is configured such that as the second ratio of the fourth light quantity to the third light quantity increases, a normal direction of a center of the reflective surface of the second prism faces a direction closer to the third light source than the second light source on the one surface of the light guide plate. This allows this display device to appropriately set the color of the light directed from the minimum display unit to the predetermined direction to the display color of that minimum display unit.

In this case, the first prism and the second prism are defined such that the reflective surface of the first prism becomes larger than the reflective surface of the second prism when a color component equivalent to a light emission color of the first light source included in the predetermined display color is greater than a color component equivalent to a light emission color of the third light source included in the predetermined display color. As a result, this display device is capable of expressing the difference in the size of each color component included in the display color of the minimum display units, so that the display color of the minimum display units is allowed to be set more flexibly.

Further, the first prism and the second prism are defined such that, among the minimum display units, a minimum display unit farther away from the incident surface of the light guide plate has a smaller curvature of the reflective surface of the first prism and a smaller curvature of the reflective surface of the second prism included in that minimum display unit. As a result, for each of the minimum display units, regardless of the distance from each of the light sources, each of the prisms included in that minimum display unit reflect light from the two corresponding light sources toward the same predetermined direction.

According to another embodiment of the disclosure, a display device including a light guide plate defined in a sheet shape with a transparent member, capable of displaying at least one pattern, and having an incident surface defined on one lateral surface and multiple light sources facing the incident surface of the light guide plate and provided along a longitudinal direction of the incident surface is provided. In this display device, the light sources include at least a first light source, a second light source, and a third light source having light emission colors different from each other. The light guide plate includes multiple prisms defined on one surface of the same and arranged along the pattern for emitting light from any of the light sources entering the light guide plate from the incident surface at other surface of the light guide plate. The pattern is configured by a combination of multiple minimum display units, and at least one of the minimum display units has a first prism and a second prism among the prisms. The first prism has a reflective surface defined as a curved surface shape that is convex with respect to the incident surface along the one surface of the light guide plate. The first prism is configured such that a ratio of a first light quantity of a first light emitted from the first light source, reflected by the reflective surface of the first prism, emitted at the other surface of the light guide plate, and directed to the predetermined direction to a second light quantity of a second light emitted from the second light source, reflected by the reflective surface of the first prism, emitted at the other surface of the light guide plate, and directed to the predetermined direction is a first ratio. The second prism has a reflective surface defined as a planar shape along the one surface, and the second prism is configured to emit light emitted from the third light source and reflected by the reflective surface of the second prism at the other surface of the light guide plate and face the predetermined direction. The first ratio, a size of the reflective surface of the first prism, and a size of the reflective surface of the second prism are set so that the minimum display unit is displayed in a predetermined display color. By having such a configuration, this display device is capable of expressing the displayed pattern in a wider variety of color combinations.

According to yet another embodiment of the disclosure, a game machine having a game machine body and a display device on the side of the game machine body facing the player is provided. In this game machine, the display device includes a light guide plate defined in a sheet shape with a transparent member, capable of displaying at least one pattern, and having an incident surface defined on one lateral surface, and multiple light sources facing the incident surface of the light guide plate and provided along a longitudinal direction of the incident surface. The light sources include at least a first light source, a second light source, and a third light source having light emission colors different from each other. The light guide plate includes multiple prisms defined on one surface facing the game machine body and arranged along the pattern for emitting light from any of the light sources entering the light guide plate from the incident surface at other surface of the light guide plate. The pattern is configured by a combination of multiple minimum display units, and at least one of the minimum display units has a first prism and a second prism among the prisms. Each of the first prism and the second prism has a reflective surface defined as a curved surface shape that is convex with respect to the incident surface along the one surface of the light guide plate. The first prism is configured such that a ratio of a light quantity of a first light emitted from the first light source, reflected by the reflective surface of the first prism, emitted at the other surface of the light guide plate, and directed to a predetermined direction to a light quantity of a second light emitted from the second light source, reflected by the reflective surface of the first prism, emitted at the other surface of the light guide plate, and directed to the predetermined direction is a first ratio. The second prism is configured such that a ratio of a light quantity of a third light emitted from the second light source, reflected by the reflective surface of the second prism, emitted at the other surface of the light guide plate, and directed to the predetermined direction to a light quantity of a fourth light emitted from the third light source, reflected by the reflective surface of the second prism, emitted at the other surface of the light guide plate, and directed to the predetermined direction is a second ratio. The first ratio and the second ratio are set such that the minimum display unit is displayed in a predetermined display color. By having such a configuration, this game machine is capable of expressing the displayed pattern in a wider variety of color combinations.

Figure 5:
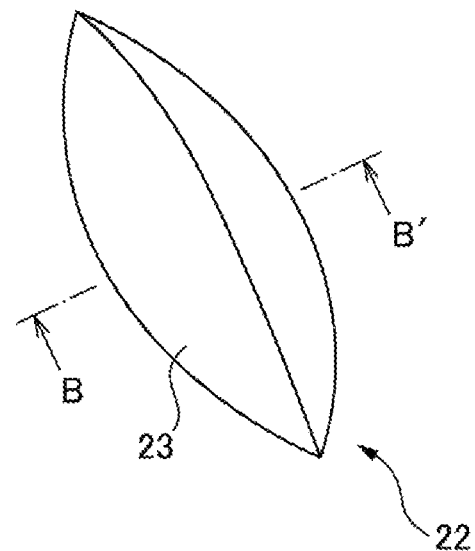
Figure 5:
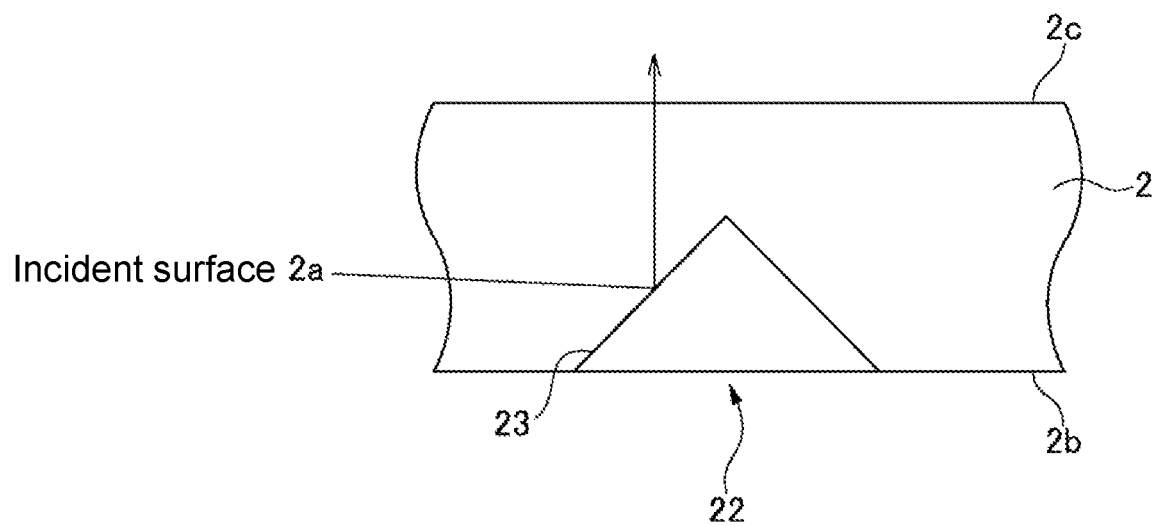

(a) and (b) of FIG. 5 are a schematic perspective view and a schematic cross-sectional view showing the shape of the prism.

Figure 6:
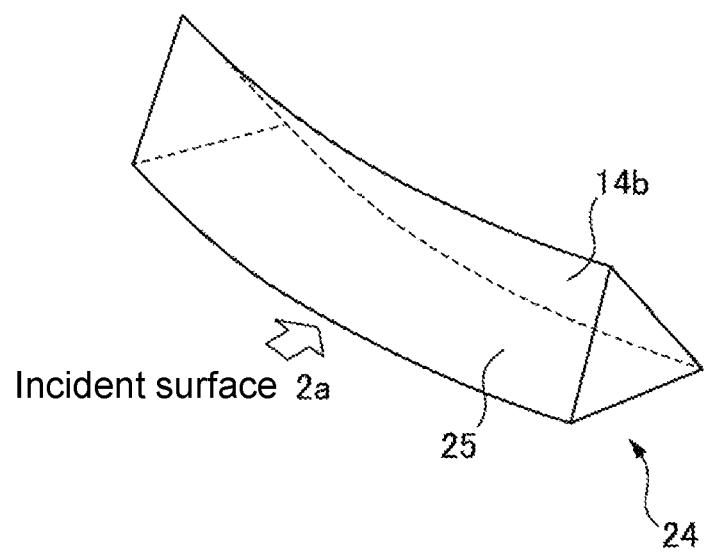
Figure 6:
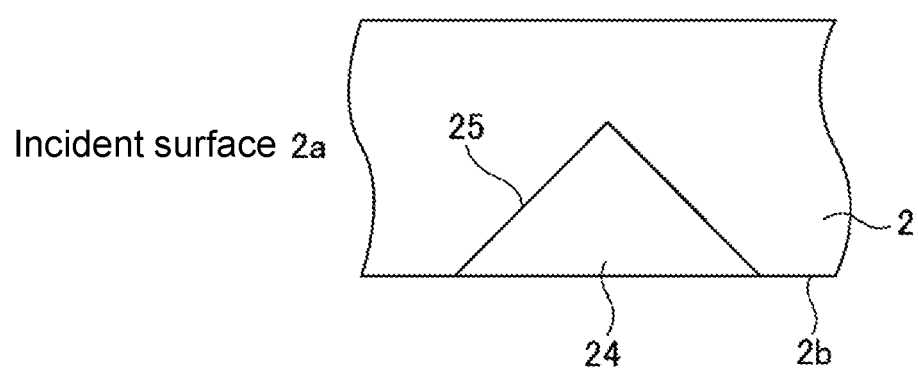

(a) and (b) of FIG. 6 are a schematic perspective view and a schematic cross-sectional view showing the shape of the prism according to a variation.

Figure 7:
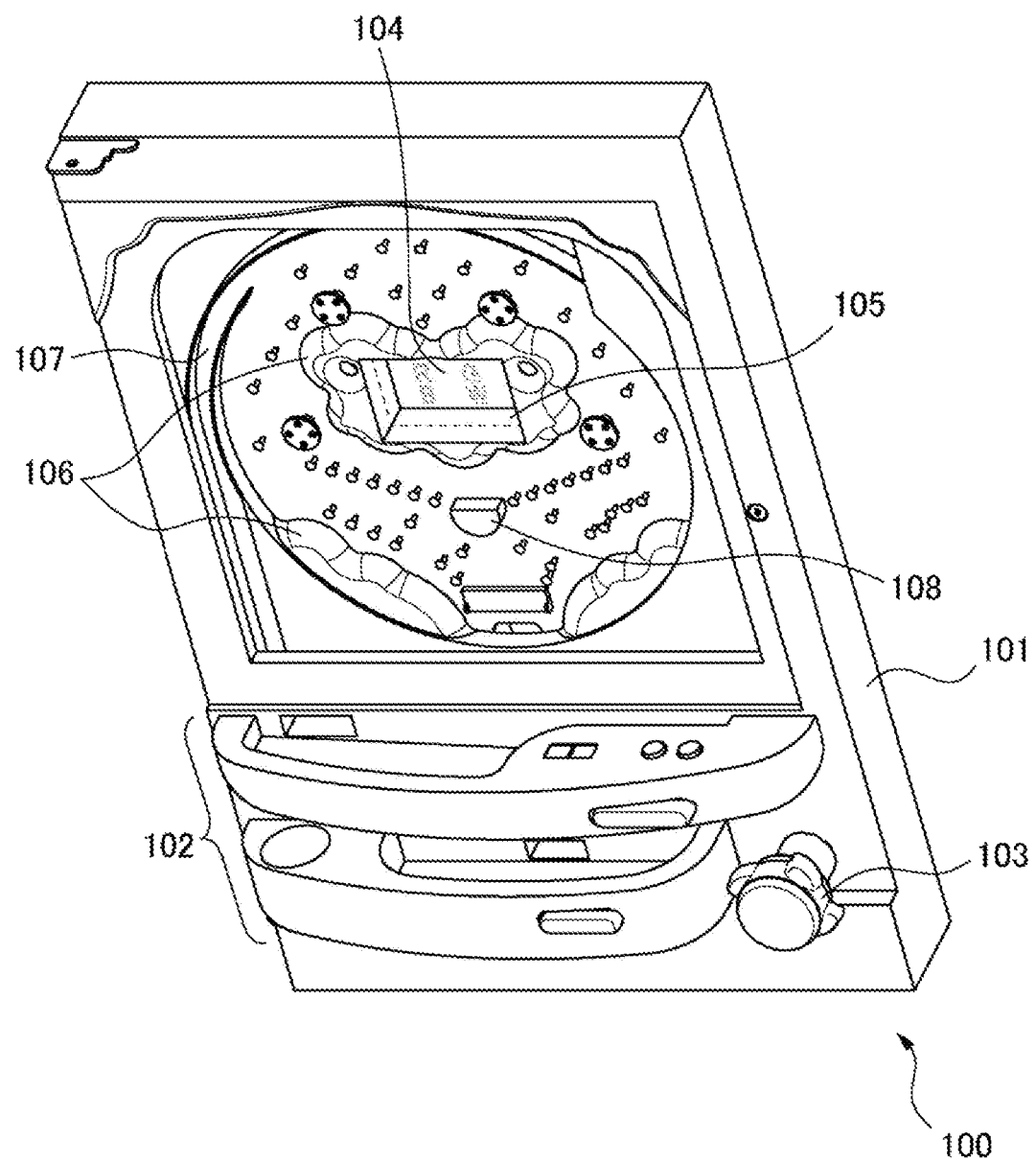

FIG. 7 is a schematic perspective view of a ball game machine having the display device according to the embodiment or the variation.

DETAILED DESCRIPTION

The display device according to the embodiment of the disclosure will be described below with reference to the drawings. This display device has a light guide plate defined as a sheet-shaped material transparent to the light emitted from multiple light sources, and a surface on the front side of the light guide plate is defined as an emission surface facing the observer. Furthermore, any of the surrounding lateral surfaces surrounding the emission surface of the light guide plate is defined as an incident surface facing the light sources. On other surface of the light guide plate facing the emission surface (hereinafter referred to as the back), there are provided multiple prisms for reflecting light emitted from the light sources and incident into the light guide plate toward the emission surface. Each of the prisms is arranged along at least one pattern displayed by the display device. In this display device, the light sources include a first light source, a second light source, and a third light source with different light emission colors. Moreover, the pattern is configured by a combination of minimum display units, which are the minimum units for color control. At least one of the minimum display units includes two prisms, when viewed from the normal direction of the back of the light guide plate, that is, along the back, each of the two prisms has a reflective surface including a curved surface shape that is convex with respect to the incident surface. The reflective surface of one of the two prisms faces a direction such that the ratio of the light quantity of a first light emitted from the first light source, reflected by the reflective surface, and directed to a predetermined direction of the emission surface to the light quantity of a second light emitted from the second light source, reflected by the reflective surface, and directed to the predetermined direction of the emission surface is the first ratio. Moreover, the reflective surface of the other one of the two prisms faces a direction such that the ratio of the light quantity of a third light emitted from the second light source, reflected by the reflective surface, and directed to the predetermined direction of the emission surface to the light quantity of a fourth light emitted from the third light source, reflected by the reflective surface, and directed to the predetermined direction of the emission surface is the second ratio. The first ratio and the second ratio are set according to the color (hereinafter sometimes referred to as display color) of the minimum display unit configured by the two prisms that is visible to the observer.

Figure 1:
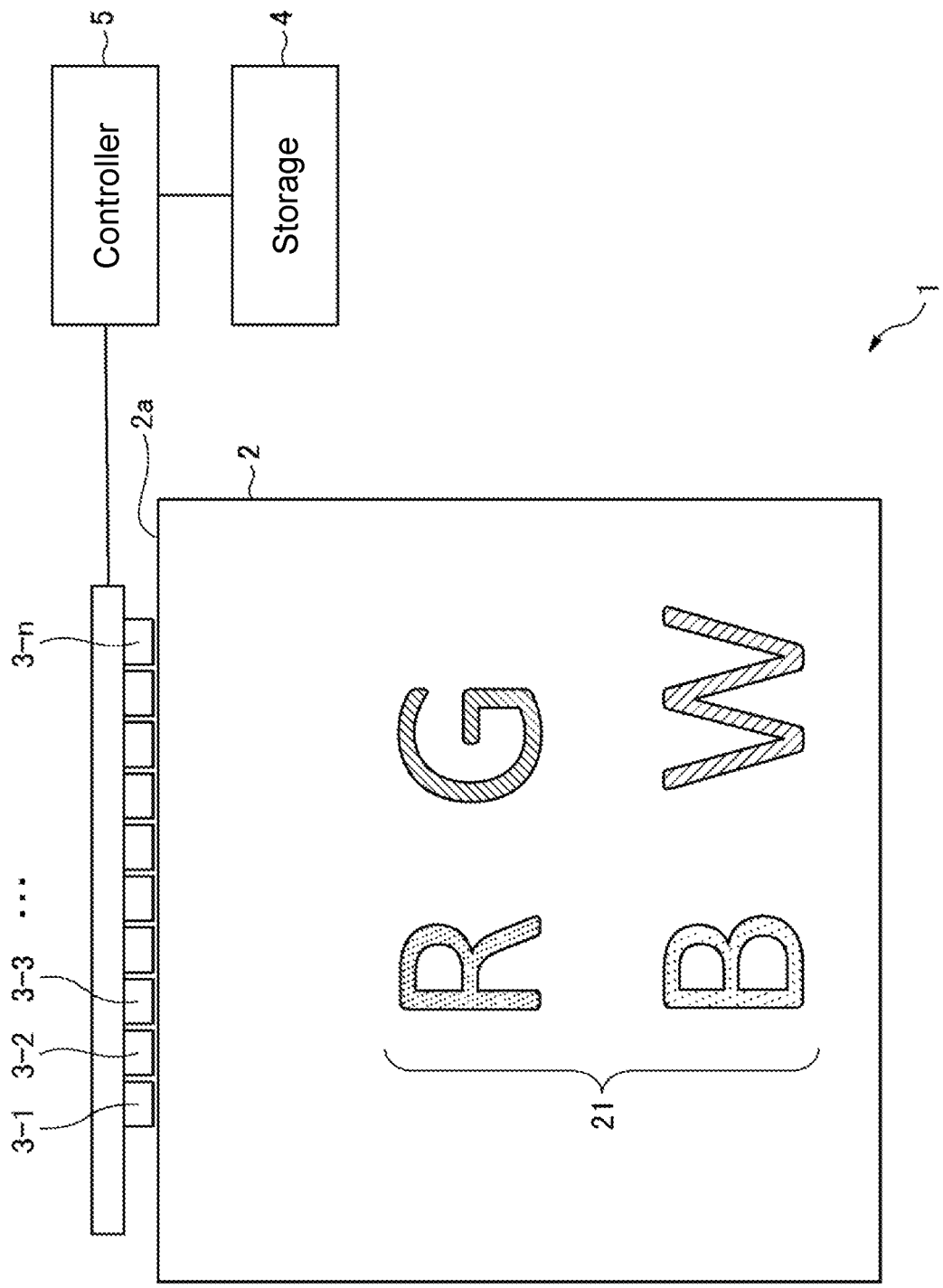
FIG. 1 is a schematic view of the configuration of the display device according to one embodiment of the disclosure.

FIG. 1 is a schematic view of the configuration of the display device according to one embodiment of the disclosure. A display device 1 includes a light guide plate 2, multiple light sources 3-1 to 3-$n$, a storage 4, and a controller 5.

The light guide plate 2 is defined as a member in a sheet shape that is transparent to the light emitted from each of the light sources 3-1 to 3-$n$. The light guide plate 2 is defined by molding a resin transparent to visible light, such as polymethyl methacrylate (PMMA), polycarbonate, or cycloolefin polymer. The light guide plate 2 is provided with a pattern 21 that is capable of being displayed with the irradiation of any one of the light sources 3-1 to 3-$n$. However, the number of patterns that are capable of being displayed on the light guide plate 2 is not limited to one, and the patterns of the patterns are not limited to the examples shown in FIG. 1. When any one of the light sources 3-1 to 3-$n$ is lit, the light guide plate 2 propagates the light from the lit light source to the inside of the same, while the prisms (details are described later) arranged on the back to define the pattern 21 reflect the light toward an observer positioned in front of the light guide plate 2. As a result, this allows the observer to visually recognize the luminous pattern 21. Details of the light guide plate 2 are described later.

Each of the light sources 3-1 to 3-$n$ has at least one light emitting element that emits visible light. In this embodiment, the light sources 3-1 to 3-$n$ are configured in a line along the longitudinal direction of an incident surface 2$a$, which is one of the lateral surfaces of the light guide plate 2. In addition, the distance between the two light sources in each set of two light sources adjacent to each other may be equal or different from each other.

Each of the light sources 3-1 to 3-$n$ is turned on or off according to the control signal from the controller 5, respectively. When the controller 5 respectively lights the light sources 3-1 to 3-$n$, the light emitted from each of the light sources 3-1 to 3-$n$ enters the light guide plate 2 through the incident surface 2$a$. After being propagated while being totally reflected inside the light guide plate 2, the incident light is reflected by the prisms provided on the back of the light guide plate 2 defining the pattern 21 and emitted at the emission surface on the front.

Each of the light sources 3-1 to 3-$n$ has a light emitting element, such as a light emitting diode (LED), that emits light in the light emission color of that light source. In addition, each of the light sources 3-1 to 3-$n$ may be a light source with variable light emission color. For example, each of the light sources 3-1 to 3-$n$ may have a red LED, a green LED, and a blue LED, respectively. In this case, the light emission color of each of the light sources 3-1 to 3-$n$ is a color corresponding to the combination of the emission intensities of the red LED, green LED, and blue LED of the light sources.

In this embodiment, the light sources 3-1 to 3-$n$ include at least one group of a first light source 3-$r$, a second light source 3-$g$, and a third light source 3-$b$ having light emission colors different from each other (however, r, g, b$\in$\{1, 2, ..., n\}, and r$\neq$g$\neq$b). For example, the light emission color of the first light source 3-$r$ is red, the light emission color of the second light source 3-$g$ is green, and the light emission color of the third light source 3-$b$ is blue. However, the combination of the light emission colors of the first light source 3-$r$, the second light source 3-$g$, and the third light source 3-$b$ is not limited to the above example, the combination of the light emission colors of the first light source 3-$r$, the second light source 3-$g$, and the third light source 3-$b$ may be determined according to the color of each part of the pattern 21 to be displayed.

Furthermore, the light sources 3-1 to 3-$n$ may include four or more light sources with different light emission colors. At this time, between the first light source 3-$r$ and the second light source 3-$g$, a light source having a light emission color, which is a complementary color of the light emission color of the first light source 3-$r$ or the light emission color of the second light source 3-$g$, may be configured. Similarly, between the second light source 3-$g$ and the third light source 3-$b$, a light source having a light emission color, which is a complementary color of the light emission color of the second light source 3-$g$ or the light emission color of the third light source 3-$b$, may be configured. In this way, the color of each part of the pattern 21 is easily adjusted. Furthermore, the number of light sources provided for each of the light emission colors may be different. For example, the number of light sources whose light emission color is white or red may be greater than the number of light sources whose light emission color is green or blue. In this way, the display color of any minimum display unit is easily adjusted to skin color. Conversely, the number of light sources whose light emission color is green or blue may be greater than the number of light sources whose light emission color is red or white. In this case, the display color of any minimum display unit is easily adjusted to light blue or yellowish green.

The storage 4 includes, for example, a volatile or non-volatile memory circuit. The storage 4 stores lighting control information representing the timings of turning on and off each of the light sources 3-1 to 3-$n$.

The controller 5 includes, for example, a processor and a drive circuit for driving each of the light sources 3-1 to 3-$n$. The controller 5 controls turning on and off the light sources 3-1 to 3-$n$ according to the lighting control information.

The controller 5 is, for example, positioned in front of the light guide plate 2. That is, when the pattern 21 is to be visible to an observer facing the emission surface of the light guide plate 2, at least one of the light sources 3-1 to 3-$n$ is lit. Moreover, when the pattern 21 is to be invisible to the observer, the controller 5 turns off each of the light sources 3-1 to 3-$n$. In addition, the controller 5 may sequentially change the combination of the light sources to be lit among the light sources 3-1 to 3-*n* according to the lighting control information, so as to dynamically change the color of the pattern 21 visible to the observer. Furthermore, when each of the light sources 3-1 to 3-*n* are configured by light sources with a variable light emission color, the controller 5 may sequentially change the light emission color of each of the light sources 3-1 to 3-*n*, so as to dynamically change the color of the pattern 21 visible to the observer. In addition, when pattern 21 is always visible, the controller 5 does not refer to the lighting control information and always lights each of the light sources 3-1 to 3-*n* while the display device 1 is operating.

Details of the light guide plate 2 are described below.

Figure 2:
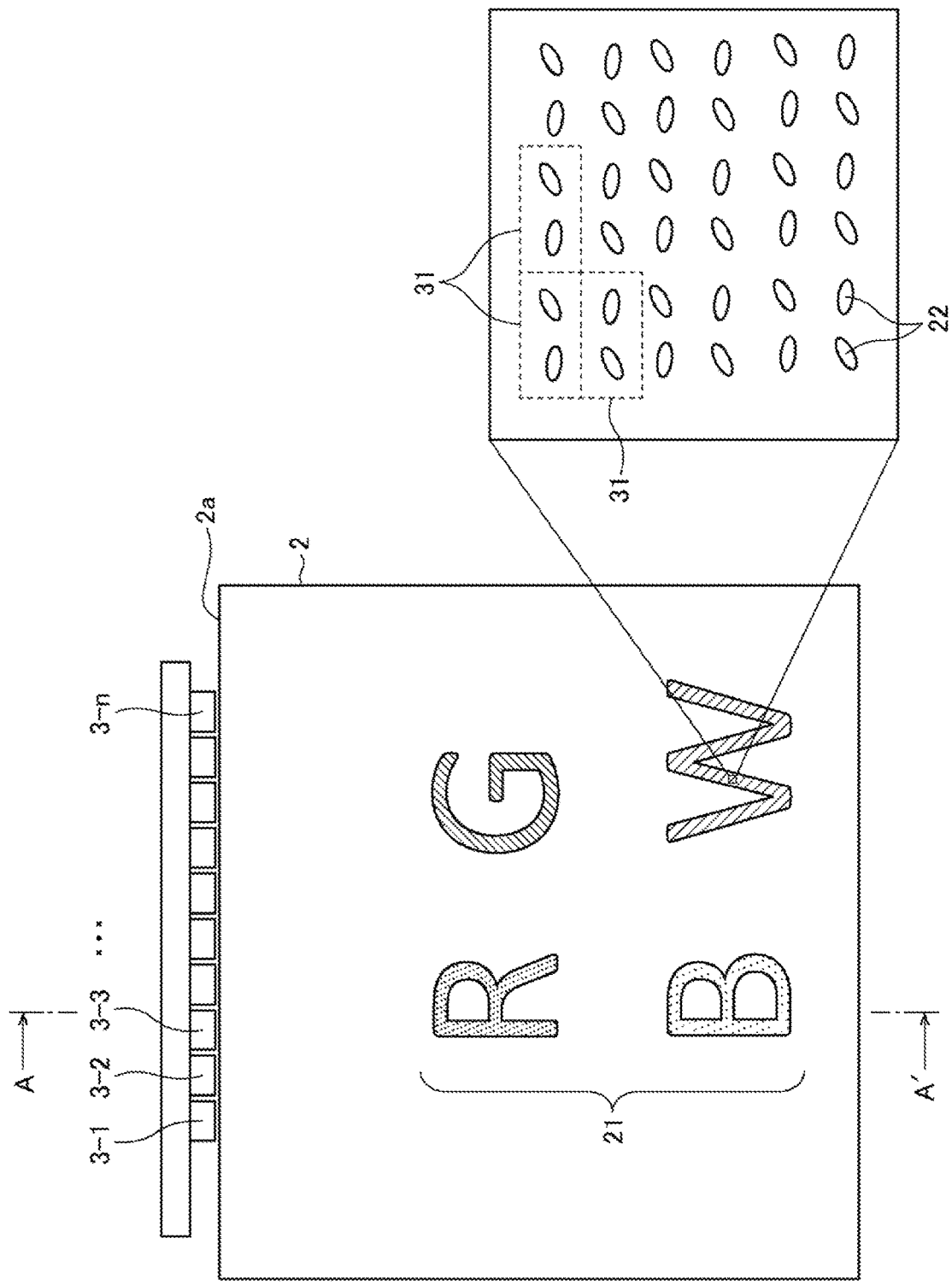
FIG. 2 is a schematic front view of the light guide plate included in the display device.
Figure 3:
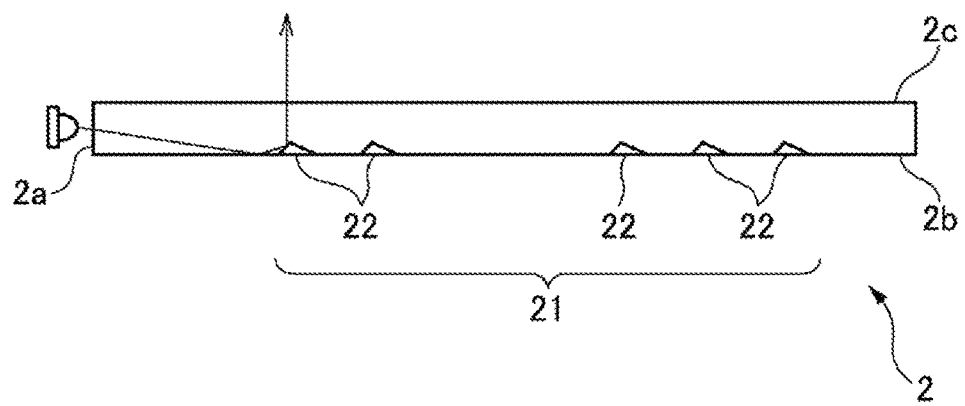
FIG. 3 is a schematic lateral cross-sectional view of the light guide plate taken along the line indicated by the arrow AA' in FIG. 2.

FIG. 2 is a schematic front view of the light guide plate 2. FIG. 3 is a schematic lateral cross-sectional view of the light guide plate 2 taken along the line indicated by the arrow AA' in FIG. 2. As shown in FIG. 2 and FIG. 3, one of the lateral surfaces of the light guide plate 2 is defined as the incident surface 2*a* facing each of the light sources 3-1 to 3-*n*. As described above, light emitted from each of the light sources 3-1 to 3-*n* are incident into the inside of the light guide plate 2 from the incident surface 2*a*. After being totally reflected by each of the groove-shaped prisms 22 on the back 2*b* of the light guide plate 2, the light from each of the light sources 3-1 to 3-*n* propagated inside the light guide plate 2 is positioned on the front side of the light guide plate 2 and emitted at the emission surface 2*c* facing the back 2*b*. Since the prisms 22 are arranged along the pattern 21, the pattern 21 appears to glow when being viewed by an observer positioned in front of the emission surface 2*c*.

In this embodiment, the pattern 21 is represented by a combination of multiple minimum display units 31. That is, the minimum display units 31 correspond to the pixels in an image, and the display device 1 controls the colors viewed by the observer for each of the minimum display units 31. When the observer visually recognizes the pattern 21 from a position at a predetermined distance (e.g., several tens of centimeters) away from the light guide plate 2, the minimum display units 31 individually has an unidentifiable size, for example, a length of several μm to several hundreds μm in the longitudinal direction.

Figure 4:
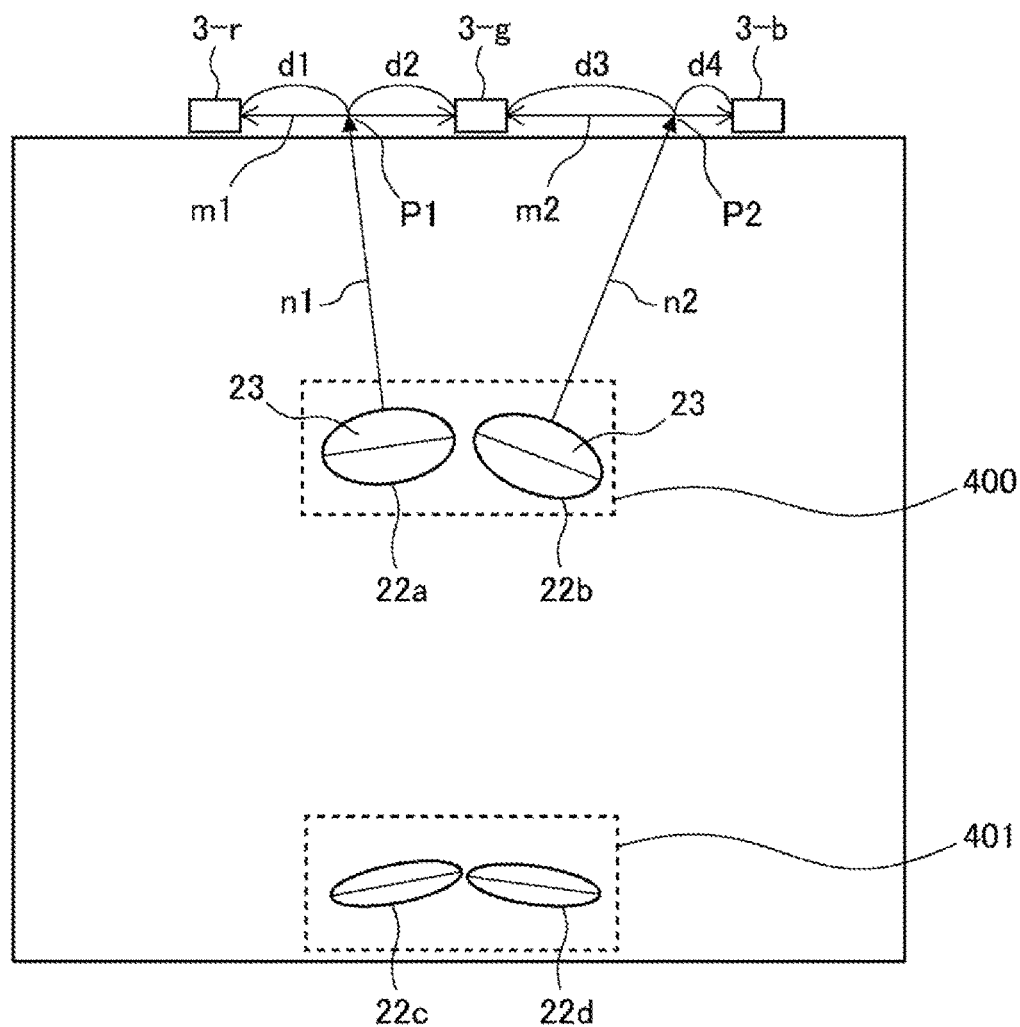
FIG. 4 is a schematic view of the light guide plate viewed from the front, showing the configuration of one minimum display unit.

FIG. 4 is a schematic view of the light guide plate 2 viewed from the front, showing the configuration of one minimum display unit. In the example shown in FIG. 4, the light emission color of the first light source 3-*r* is red, the light emission color of the second light source 3-*g* is green, and the light emission color of the third light source 3-*b* is blue. Also, the first light source 3-*r*, the second light source 3-*g*, and the third light source 3-*b* are configured at regular intervals from left to right in the longitudinal direction of the incident surface 2*a* on the light guide plate 2.

In this embodiment, one minimum display unit 400 includes two prisms 22*a* and 22*b*. The prism 22*a* is an example of a first prism, and the prism 22*b* is an example of a second prism. The two prisms 22*a* and 22*b*, defining the minimum display unit 400, respectively has a reflective surface 23 configured by an arc-shaped curved surface that is convex with respect to the incident surface 2*a* when viewed from the normal direction of the back 2*b*, that is, on a surface along the back 2*b*. Thus, the reflective surface 23 is allowed to reflect light from two of the first light source 3-*r*, the second light source 3-*g*, and the third light source 3-*b* toward the same predetermined direction of the emission surface 2*c*. It should be noted that the predetermined direction may be, for example, the normal direction of the emission surface 2*c*. That is, the reflective surface 23 of each of the two prisms 22*a*, 22*b* is defined such that any reflective surface 23 directly faces each of the two light sources corresponding to the prism on the surface along the back 2*b*.

By defining the two prisms 22*a* and 22*b* in this way, in the example shown in FIG. 4, the reflective surface 23 of the prism 22*a* on the left is allowed to reflect the light from the leftmost first light source 3-*r* and the central second light source 3-*g* toward the predetermined direction of the emission surface 2*c*. On the other hand, the reflective surface 23 of the prism 22*b* on the right is allowed to reflect the light from the rightmost third light source 3-*b* and the central second light source 3-*g* toward the predetermined direction of the emission surface 2*c*. Thus, for the minimum display unit 400, the light from each of the first light source 3-*r*, the second light source 3-*g*, and the third light source 3-*b* reaches the observer positioned in front of the emission surface 2*c*. Consequently, the minimum display unit 400 is expressed by a color obtained by additive color mixing of red by the light from the first light source 3-*r*, green by the light from the second light source 3-*g*, and blue by the light from the third light source 3-*b*.

Moreover, each of the prisms is, for example, defined such that the curvature of the reflective surface of each of the prisms included in the minimum display unit decreases as the minimum display unit moves away from each of the light sources. In the example shown in FIG. 4, each of the prisms is defined such that a minimum display unit 401, which is farther away from the light source than the minimum display unit 400, has smaller curvatures of the reflective surfaces of the prism 22*c* and the prism 22*d* than the curvatures of the reflective surfaces of the prism 22*a* and the prism 22*b* included in the minimum display unit 400. As a result, for each of the minimum display units, regardless of the distance from each of the light sources, each of the prisms included in that minimum display unit reflect light from the two corresponding light sources toward the same predetermined direction of the emission surface 2*c*.

Furthermore, on the surface along the back 2*b* of the light guide plate 2, that is, regarding the center of the reflective surface 23 of the prism 22*a* when viewed from the normal direction of the back 2*b*, the normal direction for the center (hereinafter simply referred to as the normal direction of the prism 22*a*) is determined according to the display color of the minimum display unit 400. That is, the prism 22*a* is configured such that the higher the ratio of the red component to the green component among the display color of the minimum display unit 400, the more the normal direction of the prism 22*a* goes toward the first light source 3-*r*. The closer the light source is positioned directly in front of the center of the reflective surface 23 of the prism 22*a* (i.e., the closer the position on the reflective surface 23 where the light source is positioned along the normal direction to the center of the reflective surface 23), the greater the light quantity emitted from that light source, reflected by the reflective surface 23, and directed to a predetermined direction. Thus, by configuring the prism 22 as described above, the ratio of the red component to the green component is set to a ratio corresponding to the display color of the minimum display unit 400.

More specifically, the light from the second light source 3-*g* configured at the center is allowed to be reflected toward the same direction on the emission surface 2*c* by both the prisms 22*a* and 22*b*. Thus, among the red component, the green component, and the blue component included in the display color of the minimum display unit 400, the light quantity corresponding to half of the green component, which is the light emission color of the second light source 3-*g* configured at the center, is expressed by the reflection of the light from the second light source 3-*g* by the prism 22*a*, and the light quantity corresponding to the remaining half is represented by the reflection of the light from the second light source 3-*g* by the prism 22*b*. Let p1 be the intersection point of the line m1 connecting the first light source 3-*r* and the second light source 3-*g* and the normal direction n1 of the prism 22*a*. At this time, the prism 22*a* is configured such that the ratio (R/Mh) of the light quantity (first light quantity) of the red component R to the half of the light quantity (second light quantity) Mh of the green component of the minimum display unit 400, and the ratio (d2/d1) of the distance d2 between the intersection point p1 and the second light source 3-*g* to the distance d1 between the intersection point p1 and the first light source 3-*r*, are substantially equal. It should be noted that the ratio (R/Mh) is an example of the first ratio.

Similarly, regarding the center of the reflective surface 23 of the prism 22*b* when viewed from the normal direction of the back 2*b*, the normal direction for the center (hereinafter referred to as the normal direction of the prism 22*b*) is determined according to the display color of the minimum display unit 400. That is, the prism 22*b* is configured such that the higher the ratio of the blue component to the green component among the display color of the minimum display unit 400, the more the normal direction of the prism 22*b* goes toward the third light source 3-*b*. That is, when p2 is the intersection point of the line m2 connecting the second light source 3-*g* and the third light source 3-*b* and the normal direction n2 of the prism 22*b*, the prism 22*b* is configured such that the ratio (B/Mh) of the light quantity (fourth light quantity) of the blue component B to the half of the light quantity (third light quantity) Mh of the green component of the minimum display unit 400, and the ratio (d3/d4) of the distance d3 between the intersection point p2 and the second light source 3-*g* to the distance d4 between the intersection point p2 and the third light source 3-*b*, are substantially equal. It should be noted that the ratio (B/Mh) is an example of the second ratio.

For example, when the display color of the minimum display unit 400 is represented by (R=50, G=100, B=200), the prism 22*a* is configured such that the normal direction n1 of the prism 22*a* faces a midpoint between the first light source 3-*r* and the second light source 3-*g*. Moreover, the prism 22*b* is configured such that the normal direction n2 of the prism 22*b* faces the position obtained by dividing the distance between the second light source 3-*g* and the third light source 3-*b* by 4:1.

In addition, in this example, when the display color of the minimum display unit 400 does not include the red component, the prism 22*a* may be omitted. Alternatively, the prism 22*a* may also be configured to face the same direction as the prism 22*b*. Similarly, when the display color of the minimum display unit 400 does not include the blue component, the prism 22*b* may be omitted. Alternatively, the prism 22*b* may also be configured to face the same direction as the prism 22*a*.

The prism 22*a* and the prism 22*b* may be configured such that the higher the luminance of the minimum display unit 400, the larger the reflective surface of each of the prism 22*a* and the prism 22*b*. Furthermore, the prism 22*a* is configured such that the reflective surface of the prism 22*a* becomes larger as the sum of the red component and the green component included in the display color of the minimum display unit 400 increases. Similarly, the prism 22*b* is configured such that the reflective surface of the prism 22*b* becomes larger as the sum of the green component and the blue component included in the display color of the minimum display unit 400 increases. In addition, the prism 22*a* and the prism 22*b* are allowed to be defined such that the reflective surface of the prism 22*a* becomes larger than the reflective surface of the prism 22*b* when the color component equivalent to the light emission color of the first light source 3-*r* included in the display color of the minimum display unit 400 is greater than the color component equivalent to the light emission color of the third light source 3-*b* included in the display color. Conversely, the prism 22*a* and the prism 22*b* are allowed to be defined such that the reflective surface of the prism 22*b* becomes larger than the reflective surface of the prism 22*a* when the color component equivalent to the light emission color of the third light source 3-*b* included in the display color of the minimum display unit 400 is greater than the color component equivalent to the light emission color of the first light source 3-*r* included in the display color. Thus, by setting the size of the reflective surface of each of the prisms according to the corresponding color component or luminance in the display color of the minimum display unit 400, it becomes possible to express the difference in the size of each of the color components included in the display color of the minimum display unit 400. Thus, it is possible to set the display color of the minimum display unit 400 more flexibly.

(a) of FIG. 5 is a schematic perspective view of the prism 22, and (b) of FIG. 5 is a schematic lateral cross-sectional view of the prism 22 taken along the line indicated by the arrow BB' in (a) of FIG. 5.

As shown in (a) and (b) of FIG. 5, the prism 22 is defined as a groove having a predetermined length on the back 2*b* of the light guide plate and a shape that is wide at the center and narrows toward the end. For the two inclined surfaces of the prism 22, the surface facing the incident surface 2*a* of the light guide plate 2, that is, the inclined surface facing each of the light sources 3-1 to 3-*n* is defined as the reflective surface 23 to reflect the light from the corresponding light source among the light sources 3-1 to 3-*n* toward the emission surface 2*c*. Moreover, the prism 22 is defined such that the cross-sectional shape of the surface orthogonal to the back 2*b* and the reflective surface 23 is substantially triangular. For example, the reflective surface 23 is provided so that the light emitted from the corresponding light source from each of the light sources 3-1 to 3-*n* and incident on the light guide plate 2 is totally reflected, and the angle facing the emission surface 2*c* is, for example, 40° to 50° to the back 2*b*.

(a) and (b) of FIG. 6 are a schematic perspective view and a schematic cross-sectional view showing the shape of the prism according to a variation. Similar to the prism 22, the prism 24 in this variation also has a reflective surface 25, which is an inclined surface facing each of the light sources 3-1 to 3-*n* and defined as a curved surface shape that is convex with respect to the incident surface 2*a* along the back 2*b*. On the other hand, the prism 24 is different from the prism 22 in that the inclined surface not facing each of the light sources 3-1 to 3-3 is defined concentrically with the reflective surface 25 along the back 2*b*. In addition, the prism 22 and the prism 24 are defined such that the cross-sectional shape of the reflective surface on a surface orthogonal to the back 2*b* and the reflective surface is convex with respect to the emission surface 2*c*.

As described above, in this display device, at least one of the minimum display units that individually makes up the pattern displayed on the light guide plate includes two prisms, each of the two prisms has a reflective surface defined as a curved surface shape that is convex with respect to the incident surface along the back of the light guide plate. The reflective surface of one of the two prisms faces a direction such that the ratio of the light quantity of a first light emitted from the first light source, reflected by the reflective surface, and directed to a predetermined direction of the emission surface to the light quantity of a second light emitted from the second light source, reflected by the reflective surface, and directed to the predetermined direction of the emission surface is the first ratio. Moreover, the reflective surface of the other one of the two prisms faces a direction such that the ratio of the light quantity of a third light emitted from the second light source, reflected by the reflective surface, and directed to the predetermined direction of the emission surface to the light quantity of a fourth light emitted from the third light source, reflected by the reflective surface, and directed to the predetermined direction of the emission surface is the second ratio. The first ratio and the second ratio are then set according to the color of the minimum display unit displayed by the two prisms. As a result, various display colors are allowed to be set for each of the minimum display units of the pattern, allowing this display device to express the displayed pattern in a wider variety of color combinations.

According to the variation, along the back $2b$ of the light guide plate, that is, when viewed from the normal direction of the back $2b$, the reflective surface of one of the two prisms that make up the minimum display unit is defined in a planar shape and is allowed to directly face one of the corresponding first light source, second light source, or third light source. Also in this case, by setting the orientation of the reflective surface of the other prism and the size of the reflective surface of each of the prisms according to the display color of the minimum display units, the display device is capable of setting the display color of the minimum display units to any color.

According to other variations, for each of the first light source $3\text{-}r$, the second light source $3\text{-}g$, and the third light source $3\text{-}b$, two or more of each may be configured side-by-side along the longitudinal direction of the incident surface $2a$. As a result, in the longitudinal direction of the incident surface $2a$, it is possible to widen the viewing angle at which the display colors of the individual minimum display units visible to the observer remain constant. Further, each of the light sources is allowed to be configured such that the number of any of the first light source $3\text{-}r$, the second light source $3\text{-}g$, and the third light source $3\text{-}b$ is greater than the number of other light sources.

According to still another variation, each of the first light source $3\text{-}r$, the second light source $3\text{-}g$, and the third light source $3\text{-}b$ is allowed to be configured by a light source with variable light emission color. In this case, the controller 5 is capable of controlling the light emission color of each of the light sources so that the pattern 21 is allowed to be switched between color display and monochrome display. In this case, when displaying the pattern 21 in color display, the controller 5 controls each of the light sources so that each of the light sources emits light with light emission colors different from each other in the same manner as the above embodiment. On the other hand, when displaying the pattern 21 in monochrome display, the controller 5 controls each of the light sources so that the ratio of the red component, the green component, and the blue component included in the light emission color of each of the light sources is approximately 3:6:1. As a result, the pattern 21 is monochromatized in luminance, allowing the observer to visually recognize the monochromatized pattern.

The display device according to the above-mentioned embodiments or variations may be mounted on a game machine such as a ball game machine or a platoon game machine. FIG. 7 is a schematic perspective view of a ball game machine having the display device according to the above-mentioned embodiments or variations when viewed from the player's side. As shown in FIG. 7, the ball game machine 100 includes a game board 101 as the game machine body provided in most of the area from the upper part to the center, a ball receiver 102 provided below the game board, an operation part 103 provided with a handle, an LCD display 104 provided substantially at the center of the game board 101, and a display device 105 provided in front of the LCD display 104.

The ball game machine 100 further includes an accessory 106 placed in front of the game board 101, below the game board 101, or around the display device 105 for game presentation. A rail 107 is provided on the lateral side of the game board 101. Further, a large number of obstacle nails (not shown) and at least one prize-winning device 108 are provided on the game board 101.

The operation part 103 shoots a game ball with predetermined force from a shooting device (not shown) according to the amount of rotation of the handle by the operation of the player. The shot game ball moves upward along the rail 107 and falls between many obstacle nails. When a sensor (not shown) detects that a game ball has entered any of the prize-winning devices 108, the main control circuit (not shown) provided in the back of the game board 101 puts out a predetermined number of game balls according to the prize-winning device 108 with the game ball entered, through a ball put-out device (not shown) to the ball receiver 102. Further, the main control circuit drives the LCD display 104 and the display device 105 through a CPU for presentation (not shown) provided in the back of the game board 101. Then, the CPU for presentation transmits a control signal including the lighting control information according to the state of the game to the display device 105.

The display device 105 is an example of the display device according to the above-mentioned embodiments or variations and is attached to the game board 101 so that the emission surface of the light guide plate faces the player. The controller of the display device 105 enables the player to visually recognize the pattern along with the image displayed on the LCD display 104 by lighting each of the light sources according to the lighting control information included in the control signal from the CPU for presentation. Alternatively, the controller turns off all the light sources according to the lighting control information so as to enable the player to observe only the image displayed on the LCD display 104 via the light guide plate.

In this way, a person skilled in the art is allowed to make various modifications within the scope of the disclosure according to the embodiment.

What is claimed is:

1. A display device, comprising:
   a light guide plate formed in a sheet shape by a transparent member, the light guide plate is capable of displaying at least one pattern, and having an incident surface defined on a lateral surface; and
   a plurality of light sources facing the incident surface and provided along a longitudinal direction of the incident surface;
   wherein the plurality of light sources comprise at least a first light source, a second light source, and a third light source having light emission colors different from each other, the light guide plate comprises a plurality of prisms formed on one surface of the light guide plate and arranged along the pattern, and the plurality of prisms are configured to emit light from any of the plurality of light sources entering the light guide plate from the incident surface at another surface of the light guide plate, the pattern is configured by a combination of a plurality of minimum display units, and each minimum display unit among the plurality of minimum display units includes a first prism and a second prism adjacent to the first prism formed on the one surface of the light guide plate and arranged along the pattern, the first prism has a first reflective surface formed in a curved surface shape that is convex with respect to the incident surface along the one surface, the second prism has a second reflective surface formed in a curved surface shape that is convex with respect to the incident surface along the one surface, a first light quantity of a first light is defined as an amount of light of the first light source that is reflected by the first reflective surface of the first prism towards a predetermined direction, a second light quantity of a second light is defined as an amount of light of the second light source that is reflected by the first reflective surface of the first prism towards the predetermined direction, the first prism is disposed such that a ratio between the first light quantity and the second light quantity is a first ratio, a third light quantity of a third light is defined as an amount of light of the second light source that is reflected by the second reflective surface of the second prism towards the predetermined direction, a fourth light quantity of a fourth light is defined as an amount of light of the third light source that is reflected by the second reflective surface of the second prism towards the predetermined direction, the second prism is disposed such that a ratio between the second light quantity and the third light quantity is a second ratio, and the first ratio and the second ratio are set such that each minimum display unit among the plurality of minimum display units of the pattern is displayed in a respective predetermined display color by the first prism and the second prism of each minimum display unit, wherein the first prism and the second prism are defined such that, among the minimum display units, a minimum display unit farther away from the incident surface has a smaller curvature of the reflective surface of the first prism and a smaller curvature of the reflective surface of the second prism included in that minimum display unit.

2. The display device according to claim 1, wherein the first prism is configured such that a normal direction of a center of the first reflective surface of the first prism faces a direction closer to the first light source than the second light source on the one surface of the light guide plate to increase the first ratio of the first light quantity to the second light quantity, and the second prism is configured such that a normal direction of a center of the second reflective surface of the second prism faces a direction closer to the third light source than the second light source on the one surface of the light guide plate to increase the second ratio of the fourth light quantity to the third light quantity.

3. The display device according to claim 2, wherein the first prism and the second prism are configured such that the first reflective surface of the first prism is larger than the second reflective surface of the second prism.

4. The display device according to claim 2, wherein the first prism and the second prism are defined such that, among the minimum display units, a minimum display unit farther away from the incident surface has a smaller curvature of the reflective surface of the first prism and a smaller curvature of the reflective surface of the second prism included in that minimum display unit.

5. A display device, comprising:
a light guide plate defined in a sheet shape with a transparent member, capable of displaying at least one pattern, and having an incident surface defined on one lateral surface; and
a plurality of light sources facing the incident surface and provided along a longitudinal direction of the incident surface;
wherein the light sources comprise at least a first light source, a second light source, and a third light source having light emission colors different from each other,
the light guide plate comprises a plurality of prisms defined on one surface of the light guide plate and arranged along the pattern for emitting light from any of the light sources entering the light guide plate from the incident surface at other surface of the light guide plate,
the pattern is configured by a combination of a plurality of minimum display units, and each minimum display unit among the plurality of minimum display units has a first prism and a second prism adjacent to the first prism formed on the one surface of the light guide plate and arranged along the pattern among the prisms,
the first prism has a reflective surface defined as a curved surface shape that is convex with respect to the incident surface along the one surface, and the first prism is configured such that a ratio of a first light quantity of a first light emitted from the first light source, reflected by the reflective surface of the first prism, emitted at the other surface of the light guide plate, and directed to a predetermined direction to a second light quantity of a second light emitted from the second light source, reflected by the reflective surface of the first prism, emitted at the other surface of the light guide plate, and directed to the predetermined direction is a first ratio,
the second prism has a reflective surface defined as a planar shape along the one surface, and the second prism is configured to emit light emitted from the third light source and reflected by the reflective surface of the second prism at the other surface of the light guide plate and face the predetermined direction, and
the first ratio, a size of the reflective surface of the first prism, and a size of the reflective surface of the second prism are set so that each minimum display unit among the plurality of minimum display units of the pattern is displayed in a respective predetermined display color by the first prism and the second prism of each minimum display unit,
wherein the first prism and the second prism are defined such that, among the minimum display units, a minimum display unit farther away from the incident surface has a smaller curvature of the reflective surface of the first prism and a smaller curvature of the reflective surface of the second prism included in that minimum display unit.

6. A game machine, comprising:
a game machine body; and
a display device provided on a plane facing a player of the game machine body;

wherein the display device comprises:

a light guide plate defined in a sheet shape with a transparent member, capable of displaying at least one pattern, and having an incident surface defined on one lateral surface; and a plurality of light sources facing the incident surface and provided along a longitudinal direction of the incident surface;

wherein the light sources comprise at least a first light source, a second light source, and a third light source having light emission colors different from each other, the light guide plate comprises a plurality of prisms defined on one surface of the light guide plate facing the game machine body and arranged along the pattern for emitting light from any of the light sources entering the light guide plate from the incident surface at other surface of the light guide plate, the pattern is configured by a combination of a plurality of minimum display units, and each minimum display unit among the plurality of minimum display units has a first prism and a second prism adjacent to the first prism formed on the one surface of the light guide plate and arranged along the pattern, each of the first prism and the second prism has a reflective surface defined as a curved surface shape that is convex with respect to the incident surface along the one surface, the first prism is configured such that a ratio of a light quantity of a first light emitted from the first light source, reflected by the reflective surface of the first prism, emitted at the other surface of the light guide plate, and directed to a predetermined direction to a light quantity of a second light emitted from the second light source, reflected by the reflective surface of the first prism, emitted at the other surface of the light guide plate, and directed to the predetermined direction is a first ratio, the second prism is configured such that a ratio of a light quantity of a third light emitted from the second light source, reflected by the reflective surface of the second prism, emitted at the other surface of the light guide plate, and directed to the predetermined direction to a light quantity of a fourth light emitted from the third light source, reflected by the reflective surface of the second prism, emitted at the other surface of the light guide plate, and directed to the predetermined direction is a second ratio, and the first ratio and the second ratio are set such that each minimum display unit among the plurality of minimum display units of the pattern is displayed in a respective predetermined display color by the first prism and the second prism of each minimum display unit, wherein the first prism and the second prism are defined such that, among the minimum display units, a minimum display unit farther away from the incident surface has a smaller curvature of the reflective surface of the first prism and a smaller curvature of the reflective surface of the second prism included in that minimum display unit.

* * * * *